(12) United States Patent
Park et al.

(10) Patent No.: US 9,026,086 B2
(45) Date of Patent: May 5, 2015

(54) METHOD AND APPARATUS FOR PROCESSING MESSAGES IN A MOBILE DEVICE

(71) Applicant: Samsung Electronics Co., Ltd., Gyeonggi-do (KR)

(72) Inventors: Sungho Park, Seoul (KR); Youngsun Shin, Gyeonggi-do (KR); Chaekyung Lee, Seoul (KR); Kyunghoon Han, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 247 days.

(21) Appl. No.: 13/682,931

(22) Filed: Nov. 21, 2012

(65) Prior Publication Data

US 2013/0130657 A1    May 23, 2013

(30) Foreign Application Priority Data

Nov. 22, 2011 (KR) ........................ 10-2011-0122267

(51) Int. Cl.
*H04W 88/02* (2009.01)
*H04W 4/12* (2009.01)

(52) U.S. Cl.
CPC ...................................... *H04W 4/12* (2013.01)

(58) Field of Classification Search
USPC ...................................................... 455/412.1
See application file for complete search history.

(56) References Cited

U.S. PATENT DOCUMENTS

| | | | |
|---|---|---|---|
| 5,920,858 A | 7/1999 | Kitabayashi et al. | |
| 2008/0167058 A1 | 7/2008 | Lee et al. | |
| 2008/0293413 A1 * | 11/2008 | Sharif-Ahmadi et al. | . 455/435.1 |
| 2009/0225778 A1 * | 9/2009 | Sharif-Ahmadi et al. | .... 370/469 |
| 2009/0265752 A1 * | 10/2009 | Sharif-Ahmadi et al. | ........ 726/1 |
| 2009/0304028 A1 * | 12/2009 | Sharif-Ahmadi et al. | .... 370/474 |

* cited by examiner

*Primary Examiner* — Diane Mizrahi
(74) *Attorney, Agent, or Firm* — Cha & Reiter, LLC.

(57) ABSTRACT

A method and apparatus for processing a message in a mobile device are provided. In the method, when a message is received from a designated subscriber, a control unit of the apparatus stores the received message in a corresponding application buffer and also links the received message to a combined message buffer corresponding to the designated subscriber. When there is a request for viewing messages received from the designated subscriber, the control unit lists received messages of all types linked to the combined message buffer corresponding to the designated subscriber.

18 Claims, 5 Drawing Sheets

METHOD AND APPARATUS FOR PROCESSING MESSAGES IN A MOBILE DEVICE

CLAIM OF PRIORITY

This application claims the benefit under 35 U.S.C. §119 (a) of a Korean patent application filed on Nov. 22, 2011 in the Korean Intellectual Property Office and assigned Serial No. 10-2011-0122267, the entire disclosure of which is hereby incorporated by reference.

BACKGROUND

1. Technical Field

The present disclosure relates generally to a method and apparatus for processing a message in a mobile device and, more particularly, to a method and apparatus for selectively displaying a list of messages received from a specific subscriber from among various types of received messages.

2. Description of the Related Art

A mobile device has advanced considerably to perform a variety of functions, for example, to send and receive different message service types, such as SMS (Short Message Service), MMS (Multimedia Messaging Service), IM (Instant Message), e-mail, SNS (Social Network Service) feeds, calendar (or schedule), and the like. A mobile device uses respective dedicated applications suitable for different types of received messages.

That is, in a conventional mobile device, each received message according to the above service types can be read only through a dedicated application. For example, an e-mail can be read in a mail inbox, and an SMS or MMS message can be read through a suitable message application. Therefore, when a particular person sends an e-mail and an SMS message, a recipient has to access an e-mail account and an SMS inbox, respectively, in order to read each message even though these messages are transmitted from the same person.

Additionally, it is not possible to check simultaneously the received time of messages having different message forms. For example, if a reply is sent via an e-mail in response to a request made through an SMS message, a conventional mobile device cannot provide the user with a relation between two types of messages even though an e-mail and an SMS message have a logical relation.

SUMMARY

Accordingly, the present invention is to address the above-mentioned problems and/or disadvantages and to offer at least the advantages described below.

An aspect of the present invention is to provide a method and apparatus for displaying, at the same place, various types of messages received by a mobile device, such as SMS/MMS, IM, e-mail, SNS feeds, and calendar, by filtering them according to time and group.

Another aspect of the present invention is to provide a method and apparatus for collectively displaying different types of messages received from a designated person or group and also for arranging in time different types of messages received from or sent to a designated person or group.

According to one aspect of the present invention, a method for processing a message in a mobile device includes: when a message of any type is received from a designated subscriber, storing the received message in an application buffer corresponding to the type of message received; linking the received message to a combined message buffer corresponding to the designated subscriber; and when there is a request for viewing messages received from the designated subscriber, displaying the received messages linked to the combined message buffer corresponding to the designated subscriber.

According to another aspect of the present invention, an apparatus for processing a message in a mobile device includes: a communication unit configured to receive a message of any type; an input unit configured to create an input signal for viewing the message; a memory unit including a combined message buffer and a plurality of application buffers, wherein each application buffer is associated with a respective message type; and a control unit configured to, when the message is received from a designated subscriber through the communication unit, store the received message in one of the plurality of application buffers corresponding to the message type and to link the received message to the combined message buffer corresponding to the designated subscriber, and further configured to, when there is a request for viewing messages received from the designated subscriber, display the received messages linked to the combined message buffer corresponding to the designated subscriber.

In accordance with an aspect of the present invention, an apparatus of a mobile device stores various types of messages received from a designated subscriber in a combined buffer corresponding to or assigned to the designated subscriber as well as in respective corresponding application buffers for each message type. Then, when there is a request for viewing such messages received from the designated subscriber, the apparatus retrieves the messages of any type from the combined buffer and lists them in the order of time of receipt. Therefore, it is possible to check all types of messages (e.g., SMS, e-mail etc.) from a designated subscriber at the same place without switching applications.

Other aspects, advantages, and salient features of the invention will become apparent to those skilled in the art from the following detailed description, which, taken in conjunction with the annexed drawings, discloses exemplary embodiments of the invention.

DETAILED DESCRIPTION OF EXEMPLARY EMBODIMENTS

Exemplary, non-limiting embodiments of the present invention will now be described more fully with reference to the accompanying drawings. This invention may, however, be embodied in many different forms and should not be construed as limited to the exemplary embodiments set forth herein. Rather, the disclosed embodiments are provided so that this disclosure will be thorough and complete, and will fully convey the scope of the invention to those skilled in the art. The principles and features of this invention may be employed in varied and numerous embodiments without departing from the scope of the invention.

Furthermore, well known or widely used techniques, elements, structures, and processes may not be described or illustrated in detail to avoid obscuring the essence of the present invention. Although the drawings represent exemplary embodiments of the invention, the drawings are not necessarily to scale and certain features may be exaggerated or omitted in order to better illustrate and explain the present invention.

Briefly, many message types can be received in a mobile device, including SMS/MMS, IM, e-mail, SNS feeds, and calendar (or schedule). The teachings of the present invention propose a method for collectively displaying, depending on the received time, such various types of messages received from a specific subscriber. To this end, a specific person or group is selected as a designated subscriber whose messages will be collectively displayed. Then, various types of messages received from the designated subscriber are stored in a combined buffer for the designated subscriber as well as in the respective corresponding application buffers. Thereafter, when receiving a request for viewing messages of the designated subscriber, the apparatus retrieves the messages from the combined buffer and displays them in the order of time of receipt.

Figure 1:
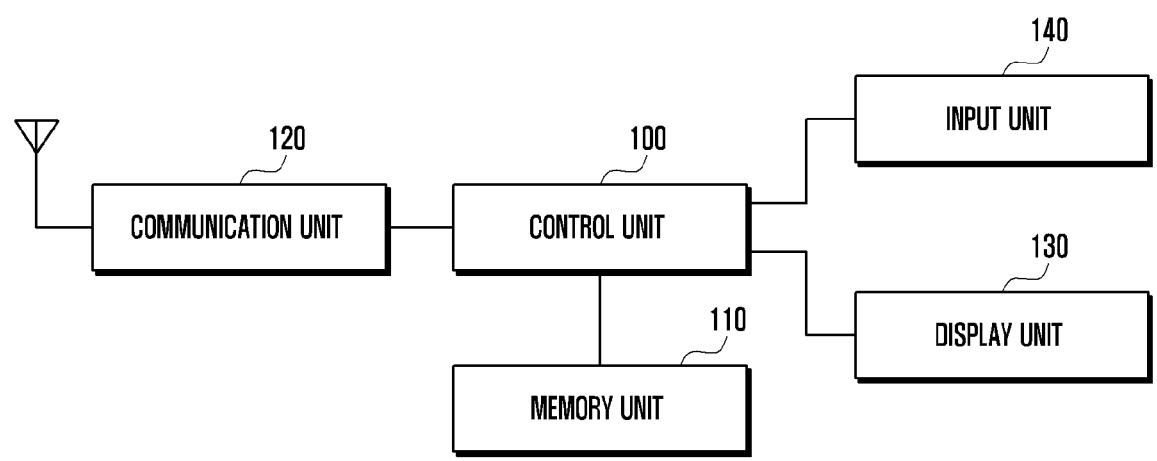
FIG. 1 is a block diagram illustrating a configuration of a mobile device in accordance with an embodiment of the present invention.

FIG. 1 is a block diagram illustrating a configuration of a mobile device in accordance with an embodiment of the present invention.

Communication unit 120 performs a function to wirelessly connect the mobile device (not shown) to a communication network. Here, the communication network may be a base station communication network or an Internet communication network. The communication unit 120 may include a transmitter composed of a frequency up-converter for up-converting an outgoing signal to an RF (radio frequency) band and a power amplifier, and a receiver composed of a low-noise amplifier and a frequency down-converter for down-converting an incoming signal to a baseband. Also, the communication unit 120 may include a modulator for modulating an outgoing signal and then delivering the modulated signal to the transmitter, and a demodulator for demodulating an incoming signal received from the receiver. The modulator and the demodulator may be adapted for 3G (third generation) communication type such as WCDMA (wideband code division multiple access) or CDMA, 4G communication type such as GSM (global system/standard for mobile communication) or LTE (long term evolution), or any other communication type such as Wi-Fi, Wibro, or Wimax.

A control unit 100 controls the whole operation of the mobile device. Specifically, the control unit 100 processes a received message according to the type of message received, and if received from a designated subscriber, links it to a combined buffer for the designated subscriber based on the time in which it was received. Also, if there is a request for viewing messages of the designated subscriber, the control unit 100 retrieves the messages linked to the combined buffer for the designated subscriber and displays them in chronological order regardless of the type of message received.

A memory unit 110 may include a program memory for storing programs required for the operation of the mobile device. Memory unit 110 may also include a data memory for storing install data and any other data created during the execution of programs. The memory unit 110 may further include buffers for storing messages by their types, and combined buffers for linking stored locations of messages received from respective designated subscribers.

A display unit 130 has the function of displaying data under the control of the control unit 100. An input unit 140 has the function of entering commands and data for controlling the operation of the mobile device. The input unit 140 and the display unit 130 may be in the form of a touch screen panel.

In the above-discussed mobile device, the user may designate a specific subscriber or a group of specific subscribers as a target for collectively displaying messages. Then, regardless of the types of messages received (e.g., SMS and e-mail), the mobile device collectively displays the messages received from the designated subscriber.

According to another embodiment of the present invention, the control unit 100 may perform a process of designating at least one specific subscriber in a setting mode by using, for example, information registered in a phonebook stored in a mobile device. Table 1 shows an example structure of a phonebook.

TABLE 1

| Photo | Name |
|---|---|
| | Phone Number |
| | E-Mail |
| | Messenger |
| | SNS |
| | — |
| | — |

In Table 1, a mobile phone number, an office phone number, and/or a residence phone number may be registered as a phone number. Also, an office e-mail address and/or at least one personal e-mail address may be registered as an e-mail. And also, an ID (identification) of MSN, Google Talk, Skype, or the like may be registered as a messenger. Additionally, an ID of Twitter, Facebook, or the like may be registered as an SNS. Namely, subscriber information recorded in a phonebook may be used to designate a subscriber for receiving various types of messages. Thus, using information registered in a phonebook, the mobile device can receive various types of messages from any specific subscriber.

In an embodiment of this invention, the control unit 100 registers at least one subscriber or group of subscribers, having subscriber information structured, for example, as shown in Table 1, as a designated subscriber for a combined message display, and allocates a combined message buffer for the designated subscriber. Thereafter, whenever any message is received from the at least one subscriber or group of subscribers, the control unit 100 invokes an application corresponding to the received message type, displays the received message on the display unit 130, and stores the received message in a buffer of the corresponding application. At the same time, the control unit 100 links the location of the message stored in the application buffer to the combined message buffer for the designated subscriber. In other words, whenever receiving a message, the control unit 100 not only stores the received message in a buffer of a corresponding application, but also links it to the combined message buffer for the designated subscriber. As a result, messages received from the designated subscriber are linked to the combined message buffer according to time of receipt and regardless of the type of message received.

Thereafter, when a request for viewing messages is inputted from the input unit 140, the control unit 100 determines whether the requested message is for messages received from a designated subscriber. If so, the control unit 100 retrieves messages linked to the combined message buffer for the designated subscriber from the memory unit 110. Then the control unit 100 displays a list of the retrieved messages on the display unit 130 in the order in which the messages were received (received time) and regardless of the types of messages received.

Figure 2:
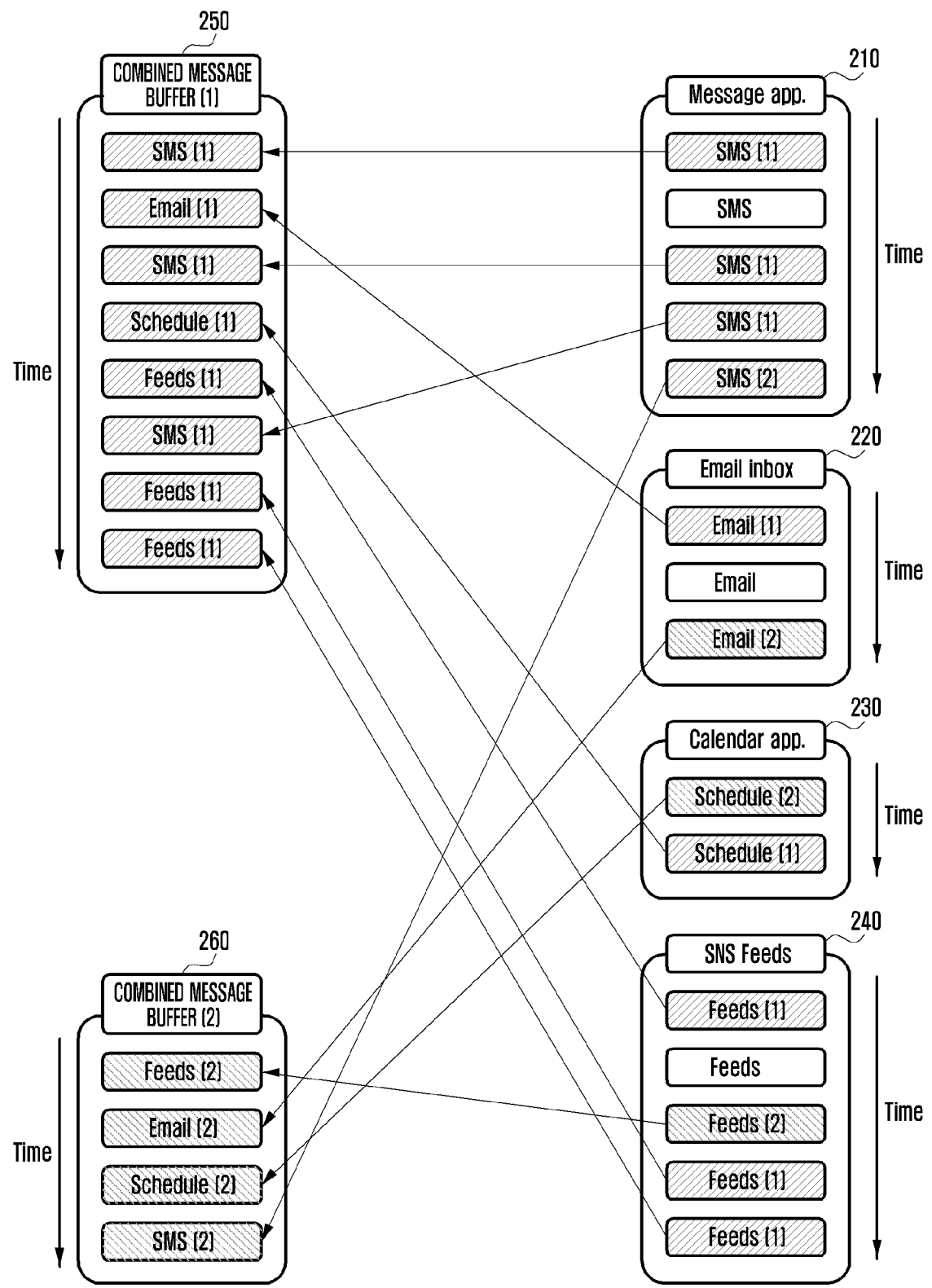
FIG. 2 is a schematic view illustrating a process of storing messages received in a mobile device in accordance with an embodiment of the present invention.

FIG. 2 is a schematic view illustrating a process of storing messages received in a mobile device in accordance with an embodiment of the present invention.

When a message is received by a mobile device, the control unit 100 invokes an application for processing the received message and stores the received message in an application buffer that corresponds to the specific type of message received. Also, the control unit 100 controls the display unit 130 to display the received message. An application for processing the received message may be a message application for processing an SMS/MMS message, an e-mail application for processing an e-mail, a calendar application for processing a schedule, an SNS application for processing an SNS message, and the like.

In FIG. 2, let's suppose that SMS (1), Email (1), Schedule (1) and Feeds (1) are received from the first designated subscriber, and SMS (2), Email (2), Schedule (2) and Feeds (2) are received from the second designated subscriber. Received messages are stored by the control unit 100 in buffers 210, 220, 230 and 240 of corresponding applications in chronological order based on time of receipt. Furthermore, if any message is received from a designated subscriber, the control unit 100 links the received message to a combined message buffer 250 or 260 with each combined message buffer corresponding to a different designated subscriber. Here, messages linked to the combined message buffer 250 or 260 are arranged in chronological order of receipt and regardless of the types of messages received.

Therefore, messages received from a designated subscriber are not only stored in the corresponding application buffers 210, 220, 230 or 240 according to each message type, but also linked to the combined message buffer 250 or 260 for the designated subscriber in the order of the time it was received and regardless of the types of messages received.

Figure 3:
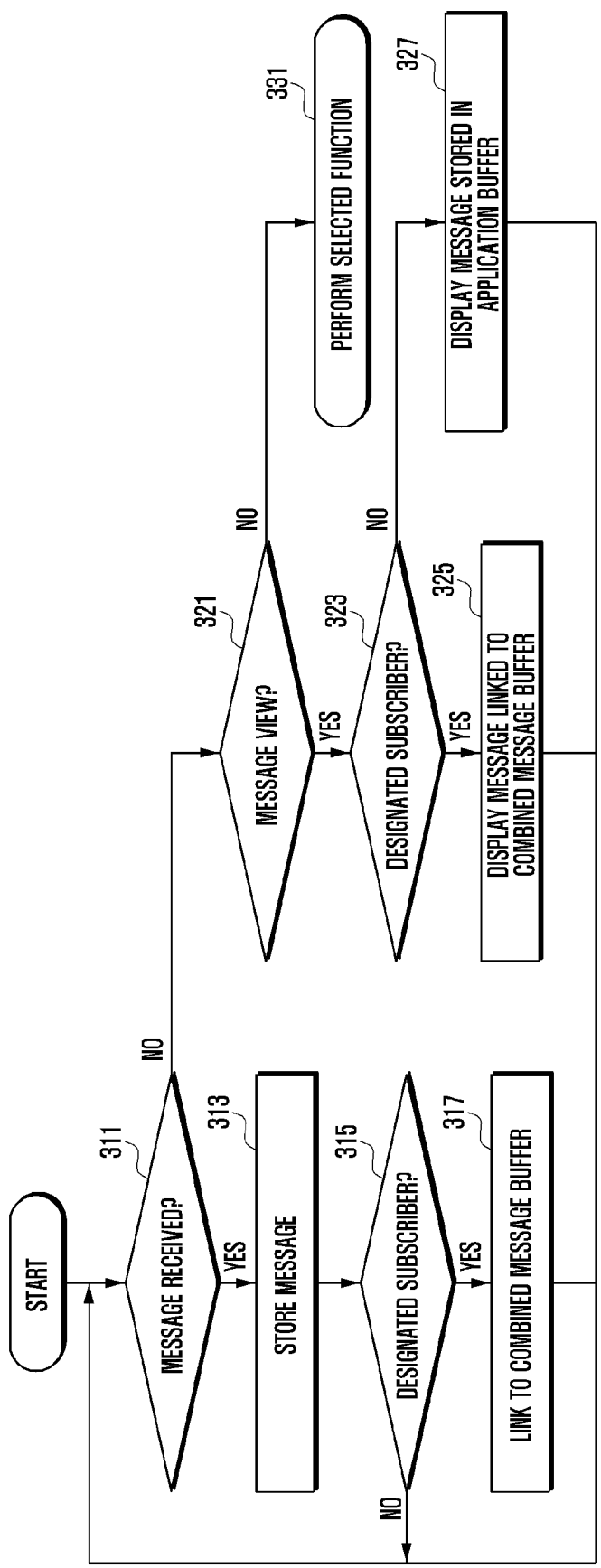
FIG. 3 is a flow diagram illustrating a method for processing a received message on the basis of the type of subscriber in accordance with an embodiment of the present invention.

FIG. 3 is a flow diagram illustrating a method for processing a received message on the basis of the type of subscriber in accordance with an embodiment of the present invention.

At the outset, a designated subscriber may be registered in a setting mode. Namely, the control unit 100 may have a mode for registering a designated subscriber in the setting mode of the mobile device. A designated subscriber may be registered personally or in a group by using subscriber information recorded in a phonebook as shown in Table 1. Messages may be received through a phone number, e-mail, messenger, or SNS ID. Therefore, it is desirable that such subscriber information can be recorded prior to or contemporaneous with the registration of a designated subscriber.

When any message is received under the circumstance that a designated subscriber has already been registered, the control unit 100 detects the reception of a message (step 311). Then the control unit 100 stores the received message in a corresponding application buffer (one of 210-240 in FIG. 2) and displays the received message on the display unit 130 (step 313). Also, the control unit 100 determines whether the received message is received from a designated subscriber (step 315). If so, the control unit 100 links a stored location of the received message in the application buffer to a combined message buffer for the designated subscriber (step 317). As discussed above, the combined message buffer stores the stored location of the received message in the order of the received time regardless of the message type. Here, the combined message buffer may also store a title and received time of the received message.

When a request for viewing stored messages is inputted from the input unit 140, the control unit 100 detects the message request (step 321) and determines whether the requested messages are messages received from a designated subscriber (step 323). If so, the control unit 100 lists messages linked to the combined message buffer for the designated subscriber on the display unit 130 (step 325). Here, these listed messages may be arranged in the order of received time or message types. If one of the displayed messages is selected by the user, the control unit 100 retrieves the selected message from the corresponding application buffer and displays the retrieved message on the display unit 130.

If the requested message is not for messages received from the designated subscriber in the step 323, the control unit 100 displays the requested message stored in the corresponding application buffer (step 327).

Figure 4:
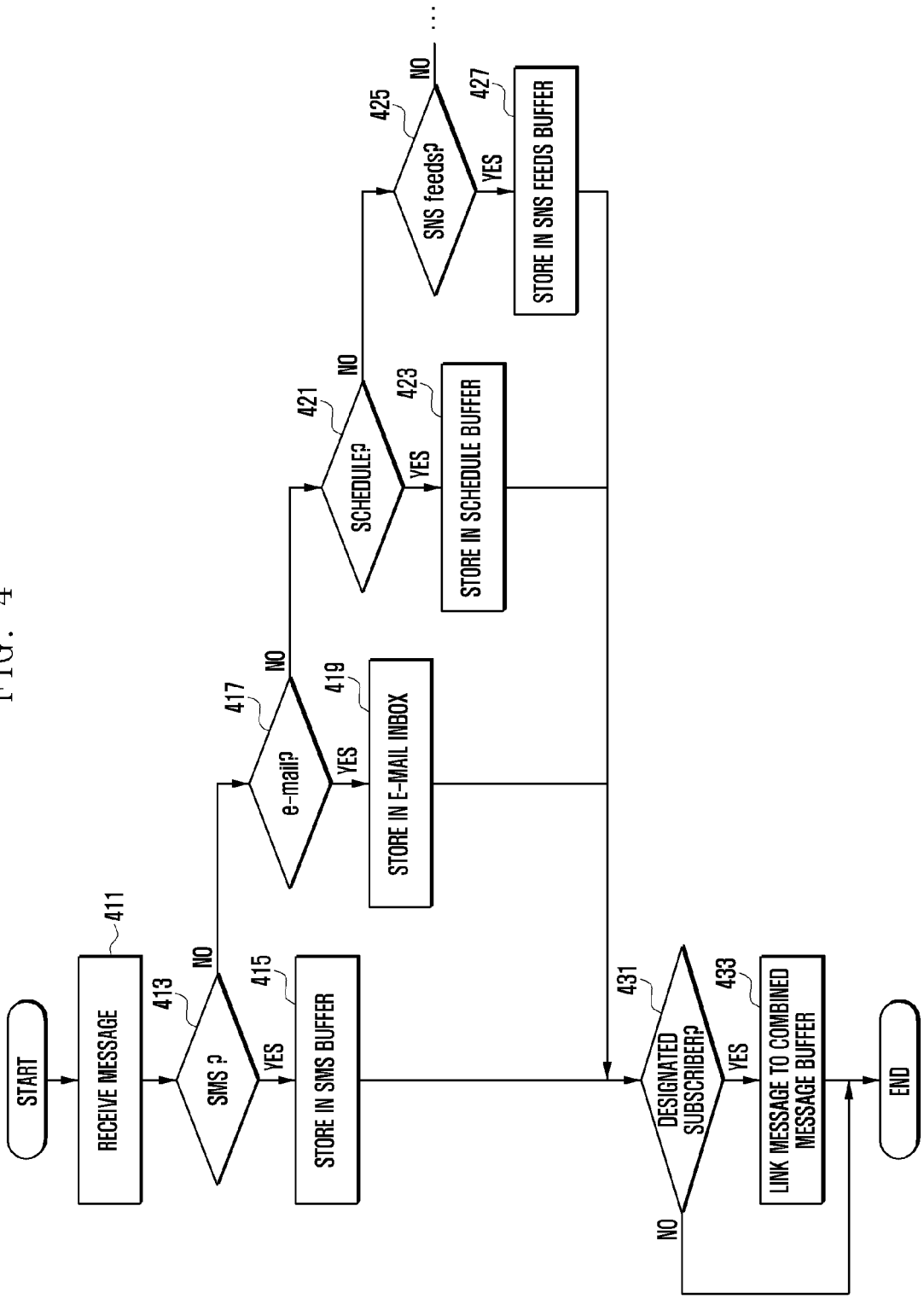
FIG. 4 is a flow diagram illustrating a method for receiving and processing a message in a mobile device in accordance with an embodiment of the present invention.

FIG. 4 is a flow diagram illustrating a method for receiving and processing a message in a mobile device in accordance with an embodiment of the present invention. Here, it is supposed that a message is one of an SMS message, an e-mail, a schedule, and an SNS feed.

The control unit 100 receives a message and checks the type of received message (step 411). If the received message is an SMS/MMS message, the control unit 100 detects it (step 413), stores the received message in an SMS buffer such as 210 of FIG. 2 (step 415), and displays it on the display unit 130. Then the control unit 100 determines whether the received message is received from a designated subscriber (step 431). If so, the control unit 100 stores the received message in a combined message buffer (such as 250 of FIG. 2) for the designated subscriber (step 433).

If the received message is an e-mail, a schedule message, or an SNS feed, the control unit 100 detects it (step 417, 421, or 425, respectively), stores the received message in a corresponding application buffer (220, 230, or 240 of FIG. 2) (step 419, 423, or 427, respectively), and displays it on the display unit 130. Then the control unit 100 determines whether the received message is received from a designated subscriber (step 431). If so, the control unit 100 stores the received message in a combined message buffer (such as 250 of FIG. 2) corresponding to the designated subscriber (step 433).

As discussed above, when a message is received, the control unit 100 invokes a corresponding application and processes the received message. Then the control unit 100 checks whether the received message is a message received from a designated subscriber, and if so, the control unit 100 links the received message to a combined message buffer for the designated subscriber.

Figure 5:
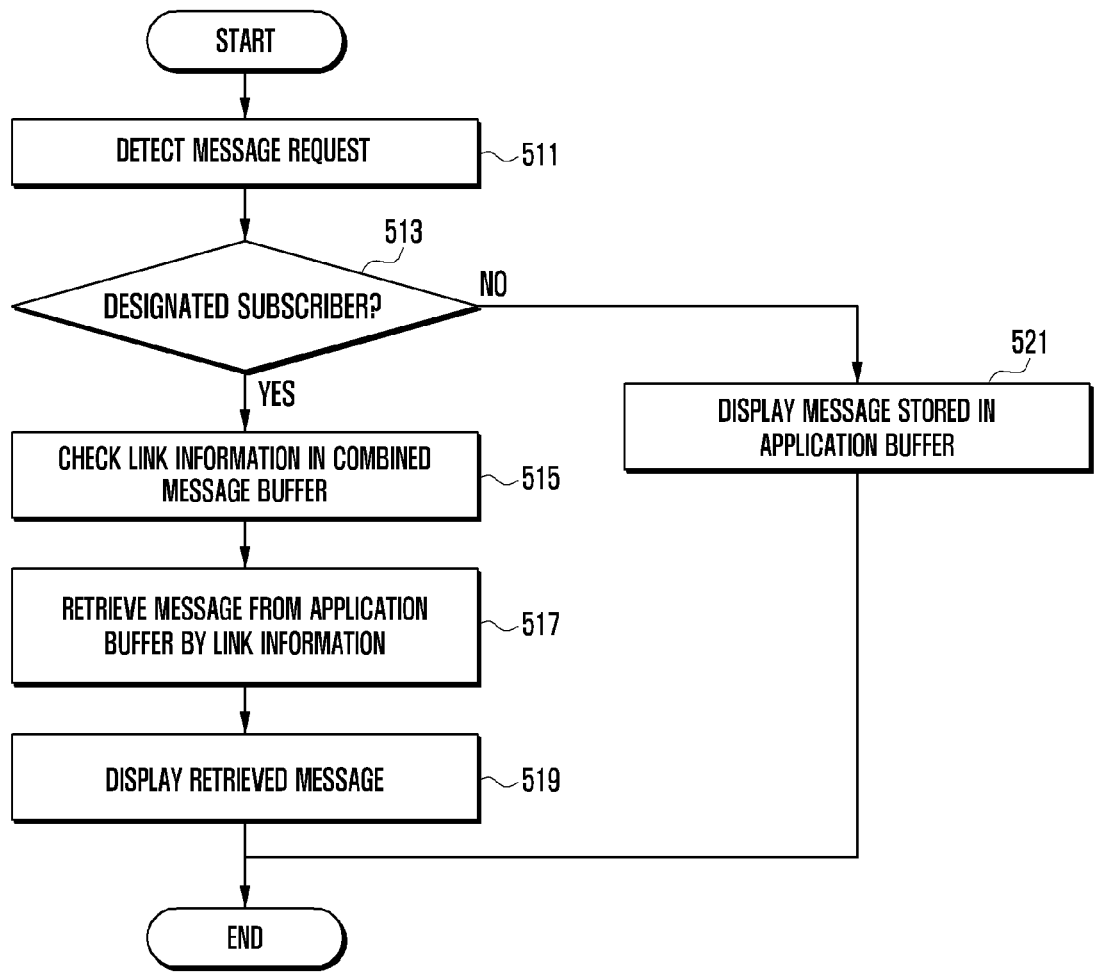
FIG. 5 is a flow diagram illustrating a method for identifying and displaying a processed message in a mobile device in accordance with an embodiment of the present invention.

FIG. 5 is a flow diagram illustrating a method for identifying a processed message in a mobile device in accordance with an embodiment of the present invention.

When a request for viewing a message is inputted from the input unit 140, the control unit 100 detects the message request (step 511) and determines whether the requested message is for messages received from a designated subscriber (step 513). If so, the control unit 100 checks link information about messages in a combined message buffer (250 of FIG. 2) for the designated subscriber and lists them in the order of received time regardless of message types (step 515). Here, the listed messages may have a title and received time thereof. Thereafter, when one of the listed messages is selected, the control unit 100 retrieves the selected message from a corresponding application buffer on the basis of the link information (step 517), and displays it (step 519).

Meanwhile, when the requested message is not for messages received from a designated subscriber, the control unit 100 displays messages stored in a corresponding application buffer (step 521).

As discussed above, the mobile device sets a specific person or group as a designated subscriber whose messages will be collectively displayed, and allows collectively viewing at the same place various types of messages received from a designated subscriber. Also, the mobile device arranges based on time different types of messages received from or sent to a designated person or group.

The above-described methods according to the present invention can be implemented in hardware, firmware or as software or computer code that can be stored in a recording medium such as a CD ROM, an RAM, a floppy disk, a hard disk, or a magneto-optical disk or computer code downloaded over a network originally stored on a remote recording medium or a non-transitory machine readable medium and to be stored on a local recording medium, so that the methods described herein can be rendered in such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

While the present invention has been particularly shown and described with reference to exemplary embodiments thereof, it will be understood by those skilled in the art that various changes in form and details may be made therein without departing from the spirit and scope of the present invention as defined by the appended claims.

What is claimed is:

1. A method comprising:
   allocating, in a memory of an electronic device, a plurality of application buffers and a combined message buffer, each of the plurality of application buffers being designated for storage of a different type of message, and the combined message buffer being designated for storage of links to messages stored in any one of the plurality of application buffers that are received at the electronic device from a registered entity;
   for each message received at the electronic device from the entity, storing the message in one of the plurality of application buffers that corresponds to a type of the message and linking the message to the combined message buffer;
   in response to a request for viewing messages received from the entity, generating a list of messages based on the combined message buffer and displaying the list on a display unit of the electronic device; and
   in response to a selection of a first message from the list, retrieving the first message from one of the plurality of application buffers where the first message is stored and displaying the first message.

2. The method of claim 1, wherein the combined message buffer is exclusive to the entity, and the entity includes one or more contacts identified in a contacts book of the electronic device.

3. The method of claim 1, wherein each message received at the electronic device from the entity is linked to the combined message buffer when the message is received.

4. The method of claim 1, wherein the first message is a Social Network Service feed message, and the plurality of buffers includes a Social Network Service feed buffer that stores only Social Network Service feed messages.

5. The method of claim 1, wherein the plurality of application buffers includes at least one of a Short Message Service buffer, a Multimedia Messaging Service buffer, an Instant Message buffer, an e-mail buffer, and a schedule buffer.

6. The method of claim 1, wherein the first message includes one of an e-mail message and a Short Message Service message.

7. The method of claim 6, further comprising retrieving from a contact book of the electronic device a plurality of network identifier for a given contact and registering the entity based on the plurality of network identifiers.

8. The method of claim 1, wherein the entity consists of single contact that is registered in a contacts book of the electronic device.

9. The method of claim 1, wherein the entity includes a group of contacts, wherein each of the contacts in the group is identified in a contacts book of the electronic device.

10. An electronic device comprising:
    a memory storing a plurality of application buffers and a combined message buffer, each of the plurality of application buffers being designated for storage of a different type of message, and the combined message buffer being designated for storage of links to messages stored in any one of the plurality of application buffers that are received at the electronic device from a registered entity; and
    a control unit configured to:
    for each message received at the electronic device from the entity, store the message in one of the plurality of application buffers that corresponds to a type of the message and link the message to the combined message buffer;
    in response to a request for viewing messages received from the entity, generate a list of messages based on the combined message buffer and display the list on a display unit of the electronic device; and
    in response to a selection of a first message from the list, retrieve the first message from one of the plurality of application buffers where the first message is stored and display the first message.

11. The electronic device of claim 10, wherein the combined message buffer is exclusive to the entity, and the entity includes one or more contacts identified in a contacts book of the electronic device.

12. The electronic device of claim 11, wherein each message received at the electronic device from the entity is linked to the combined message buffer when the message is received.

13. The electronic device of claim 10, wherein the first message is a Social Network Service feed message, and the plurality of buffers includes a Social Network Service feed buffer that stores only Social Network Service feed messages.

14. The electronic device of claim 10, wherein the plurality of application buffers includes at least one of a Short Message Service buffer, a Multimedia Messaging Service buffer, an Instant Message buffer, an e-mail buffer, and a schedule buffer.

15. The electronic device of claim 10, wherein the first message includes one of an e-mail message and a Short Message Service message.

16. The electronic device of claim 10, wherein the control unit is further configured to retrieve from a contact book of the electronic device a plurality of network identifier for a given contact and register the entity based on the plurality of network identifiers.

17. The electronic device of claim 10, wherein the entity consists of single contact that is registered in a contacts book of the electronic device.

18. The electronic device of claim 10, wherein the entity includes a group of contacts, wherein each of the contacts in the group is identified in a contacts book of the electronic device.

\* \* \* \* \*